(12) United States Patent
Taskiran et al.

(10) Patent No.: US 12,391,369 B2
(45) Date of Patent: Aug. 19, 2025

(54) CAVITY

(71) Applicant: TUSAS—TURK HAVACILIK VE UZAY SANAYII ANONIM SIRKETI, Ankara (TR)

(72) Inventors: Engin Taskiran, Ankara (TR); Senol Baskaya, Ankara (TR)

(73) Assignee: TUSAS—TURK HAVACILIK VE UZAY SANAYII ANONIM SIRKETI, Ankara (TR)

( * ) Notice: Subject to any disclaimer, the term of this patent is extended or adjusted under 35 U.S.C. 154(b) by 84 days.

(21) Appl. No.: 18/269,061

(22) PCT Filed: May 24, 2021

(86) PCT No.: PCT/TR2021/050478
§ 371 (c)(1),
(2) Date: Jun. 22, 2023

(87) PCT Pub. No.: WO2022/146283
PCT Pub. Date: Jul. 7, 2022

(65) Prior Publication Data
US 2024/0059399 A1 Feb. 22, 2024

(30) Foreign Application Priority Data

Dec. 30, 2020 (TR) .................. 2020/22407

(51) Int. Cl.
*B64C 23/00* (2006.01)
*B64C 25/00* (2006.01)
*B64D 1/06* (2006.01)

(52) U.S. Cl.
CPC .............. *B64C 23/005* (2013.01); *B64D 1/06* (2013.01); *B64C 2025/003* (2013.01); *B64C 2230/14* (2013.01)

(58) Field of Classification Search
CPC .............. B64C 23/005; B64C 2230/14; B64C 2230/08; B64C 2230/24; B64D 1/06
See application file for complete search history.

(56) References Cited

U.S. PATENT DOCUMENTS

| | | | | |
|---|---|---|---|---|
| 2,791,387 A | * | 5/1957 | Weinberg ................. | B64D 1/04 89/1.51 |
| 3,934,846 A | * | 1/1976 | Maurer .................... | B64D 1/04 244/130 |
| 4,520,975 A | * | 6/1985 | Blackhurst ............... | B64D 1/02 89/1.51 |
| 4,838,502 A | * | 6/1989 | Pinson .................... | F42B 10/42 244/49 |

(Continued)

OTHER PUBLICATIONS

International Search Report and Written Opinion for PCT application No. PCT/TR2021/050478, mailed Sep. 29, 2021.

(Continued)

*Primary Examiner* — Joshua J Michener
*Assistant Examiner* — Michael B. Kreiner
(74) *Attorney, Agent, or Firm* — Notaro, Michalos & Zaccaria P.C.

(57) ABSTRACT

A body, a cavity located on the body, enabling to place ammunition and similar payloads therein, a rear wall which is the surface on which an airflow occurring with the movement of the body leaves the cavity, and a floor over which the airflow moves along the cavity is disclosed.

14 Claims, 5 Drawing Sheets

(56) References Cited

U.S. PATENT DOCUMENTS

| | | | |
|---|---|---|---|
| 5,340,054 A * | 8/1994 | Smith | B64C 23/06 |
| | | | 244/1 N |
| 5,979,828 A * | 11/1999 | Gruensfelder | B64C 1/14 |
| | | | 244/129.4 |
| 6,296,202 B1 * | 10/2001 | Stanek | B64D 1/06 |
| | | | 244/1 N |
| 6,739,554 B1 | 5/2004 | Stanek | |
| 9,248,905 B2 * | 2/2016 | Gerard | B64C 23/005 |
| 10,823,207 B2 * | 11/2020 | Cohen | F15D 1/005 |
| 11,174,009 B2 * | 11/2021 | Edwards | B64C 27/10 |
| 11,407,497 B2 * | 8/2022 | Patience | B64C 23/005 |
| 2016/0031386 A1 | 2/2016 | Patience | |
| 2019/0040883 A1 | 2/2019 | Cohen et al. | |
| 2020/0062379 A1 | 2/2020 | Patience | |

OTHER PUBLICATIONS

International Preliminary Report on Patentability, completed Nov. 22, 2022.
Demand/Request for Preliminary Examination dated Oct. 21, 2022.
International Application Status Report generated Jun. 5, 2023.

* cited by examiner

CAVITY

FIELD

This invention relates to the geometry of cavities in aerodynamic surfaces.

BACKGROUND

When aerodynamic surfaces are in motion, an air flow boundary layer forms thereon, forming a slip layer where the surface continuity ends. There are landing gear, ammunition payload and similar equipment in the cavities in air vehicles, which cause the surface continuity to end. Vibration problems, acoustic problems and turbulence occur in cavities due to the instability of the slip layer. Air vehicles are subjected to a challenging regime, especially when ammunition is dropped in high subsonic, transonic and supersonic flows. These unstable and strong structures formed in the flow area can cause structural and irreversible damages in terms of aerodynamics and aeroacoustics. Therefore, controlling the flow formed in the cavity enables the prevention of possible damages. There are active and passive methods available for controlling the air flow within the cavity. Passive methods are systems that operate without energy input. In active methods, in turn, it is necessary to supply external energy to operate the system.

The United States patent document US20190040883, which is included in the known state of the art, discloses changes made to the rear wall of a cavity in aircrafts in order to reduce cavity-induced vibrations and noises in areas such as ammunition storage and landing gear. In terms of the geometry of cavity, it is mentioned that the rear wall of the cavity is made completely convex.

In another published patent document no. US2020/062379A1, a cavity system is disclosed. The cavity system comprises a cavity comprising a cavity opening; and an acoustically reflective structure located at least partially within the cavity (2). The acoustically reflective structure comprises one or more acoustically reflective surfaces wherein each acoustically reflective surface is oblique to a plane of the cavity opening. The one or more acoustically reflective surfaces may be arranged to reflect incident acoustic waves out of the cavity opening while avoiding reflection into a region at or proximate to a leading edge of the cavity. Accordingly, a form of cavity tone suppression and/or control by reflecting as much acoustic energy out of the cavity as possible is provided in order to minimise the acoustic energy propagated forward to interact with shear layer close to the leading edge.

In the other published patent document no. U.S. Pat. No. 6,739,554B1, an aircraft weapons bay acoustic resonance suppression system is disclosed. The system includes a rod mounted upon and spaced a distance from an extensible aircraft spoiler. The rod has a hollow core and includes a multiplicity of apertures axially aligned into two groups, placed at the point of fluid separation. A multiplicity of synthetic jets is received within the rod, each jet in fluid communication with a corresponding aperture. The jets combine to form first and second perturbation elements. The perturbation elements are sinusoidally driven out of phase at high frequencies by an actuator. This effectively creates a high frequency forcing of the airstream which is amplified by the airflow, creating a violent shedding. Advantageously, this violent shedding dramatically reduces acoustic resonance within the weapons bay of the aircraft. Thanks to the system, undesirable acoustic resonances within an open weapons bay of an aircraft in flight are reduced.

Yet another published document no. US2016/031386A1 discloses a cavity system for cavity acoustic tones suppression wherein the system tends to increase the thickness of the shear layer (22). The cavity system comprises a cavity and a plurality of rods extending away from the cavity base to a height extending beyond the leading edge. The rods are positioned downstream of and in the proximity of the leading edge. The rods may extend to different heights and/or be positioned longitudinally offset. The rods may be reversibly movable to a configuration in which they are fully enclosed in the cavity when the cavity is closed. Flow alteration elements, in the form of channels passing through the rods and/or in the form of protrusions extending from the rod, may be provided on the rods. Therefore, a form of suppression by generating multiple fine scale turbulences i.e. resulting in multiple small vortices, within the shear layer, thereby disrupting the formation of large scale vortices in the shear layer which are part of the tone generation process, and moreover the multiple fine scale turbulences tend not to combine into larger ones are provided.

SUMMARY

With a cavity geometry developed by the present invention, it is enabled to reduce aeroacoustic noises caused by pressure fluctuations due to high-speed air flow.

An air vehicle developed to achieve the object of the invention, as defined in the first claim and in the claims dependent thereon, comprises a cavity disposed on aerodynamic surfaces, which are called bodies, and accommodating landing gears, ammunitions and similar equipment; a rear wall, which is the surface that the air flow formed by the movement of the body contacts at the end after proceeding along the cavity; and a floor, which is the surface that forms the length of the cavity, and on which a boundary layer formed by the air flow on the body proceeds as a slip layer along the cavity.

The air vehicle of the invention comprises a reinforcer having a layer that is positioned lengthwise on the rear wall of the cavity, produced in an inclined form and located so that it extends in the opposite direction to the air flow into the cavity, and that enables to reduce undesirable effects such as aeroacoustic noise and resonance caused by the air flow by widening the distance towards the interior of the cavity, between the part of the layer facing the floor and the floor itself.

In an embodiment of the invention, the air vehicle comprises an intersection edge that is the site of intersection of the rear wall, which is the last surface to be exposed to air flow in the cavity, with the floor of the cavity; a trailing edge that is the last part of the cavity to encounter the air flow; and an arc-shaped reinforcer that is mirror-symmetrically positioned on an axis extending perpendicular to the rear wall at an equal distance to the intersection edge and to the trailing edge.

In an embodiment of the invention, the air vehicle comprises a reinforcer with a curvature towards the interior of the cavity, one edge of the reinforcer being positioned on the intersection edge and the other edge thereof being positioned on the trailing edge.

In an embodiment of the invention, the air vehicle comprises a reinforcer with an arc angle that is determined according to a parameter obtained by proportioning the value of the cavity depth to the longest distance between the cavity rear wall and the layer.

In an embodiment of the invention, the air vehicle comprises a reinforcer that is produced from a piezoelectric material and thereby enables to generate electrical energy from pressure and stress acting thereon.

In an embodiment of the invention, the air vehicle comprises a reinforcer that is produced with a material having a porous structure and thereby reduces the level of aeroacoustic noise.

In an embodiment of the invention, the air vehicle comprises a reinforcer that enables to change the distance between the layer and the rear wall by reducing or increasing the arc angle thanks to manufacturing the reinforcer and the layer thereon with a flexible material.

In an embodiment of the invention, the air vehicle comprises a reinforcer manufactured in one piece with the rear wall of the cavity.

In an embodiment of the invention, the air vehicle comprises a reinforcer that can be attached to and detached from the rear wall of the cavity.

In an embodiment of the invention, the air vehicle comprises a reinforcer fabricated with a shape memory alloy, the reinforcer having a first position (I) wherein the reinforcer has the same form as the rear wall and thus shortens the length of the cavity only as the thickness of material when payloads such as landing gear or ammunition is present in the cavity, and a second position (H) wherein the reinforcer assumes an arc form on the rear wall by being triggered by a control unit for changing its shape when the lids of the cavity are opened for dropping ammunition or deploying the landing gear, the reinforcer being capable to switch between the first position (I) and the second position (II) by means of the control unit.

In an embodiment of the invention, the air vehicle comprises a reinforcer having a third position (Ill), wherein the lids of the cavity, in which payloads such as ammunition, landing gear is present, are closed and the reinforcer is located on the floor and therefore does not cause the length of the cavity to shorten, and a fourth position (IV), wherein the reinforcer comes onto the rear wall by being moved from the third position (III) by means of a robotic arm when ammunition is dropped or landing gear is put down with the opening of the cavity lids.

In an embodiment of the invention, the air vehicle comprises a reinforcer with at least one heater for removal or prevention of icing occurring on aerodynamic surfaces such as reinforcers due to free air flow taking place on the body.

BRIEF DESCRIPTION OF THE DRAWINGS

The air vehicle realized to achieve the object of the present invention is shown in the accompanying figures, wherein from these figures.

DETAILED DESCRIPTION

Figure 1:
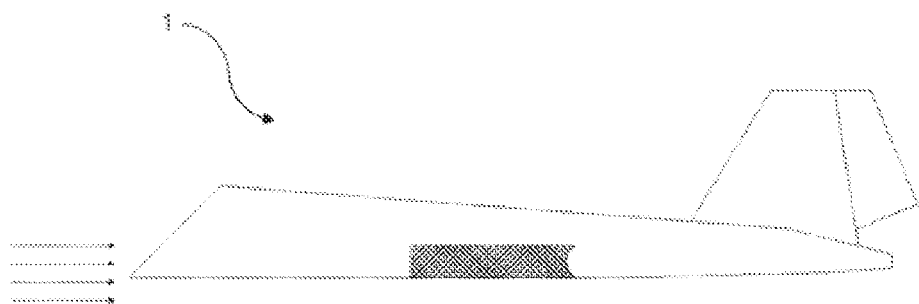
FIG. 1 is a schematic view of the air vehicle and cavity.

The parts illustrated in figures are individually assigned a reference numeral and the corresponding terms of these numbers are listed below.

1. Air vehicle
2. Body
3. Cavity
4. Rear wall
5. Floor
6. Layer
7. Reinforcer
8. Trailing edge
9. Intersection edge
10. Control unit
11. Robotic arm
12. Heater
(AF) Air flow
(P) Plane
(D) Depth
(C) Length
(A) Angle
(L) Height The air vehicle (1) comprises a body (2), a cavity (3) located on the body (2), enabling to place ammunition and similar payloads therein, a rear wall (4) which is the surface on which an airflow (AF) occurring with the movement of the body (2) leaves the cavity (3), and a floor (5) over which the airflow (AF) moves along the cavity (3). (FIG. 1)

Figure 2:
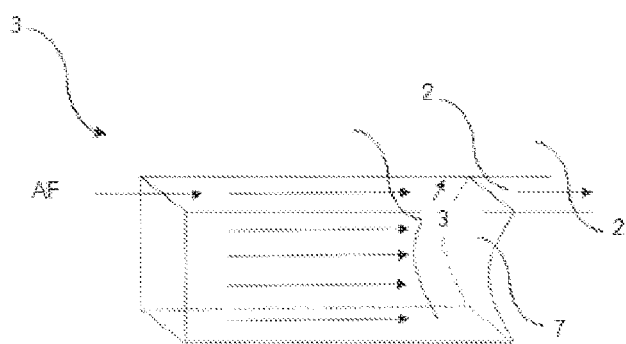
FIG. 2 is a perspective view of the cavity and the reinforcer.

The air vehicle (1) of the invention comprises at least one reinforcer (7) having a curved layer (6) located lengthwise on the rear wall (4) and positioned so as to extend into the cavity (3), and a layer (6) that enables to reduce the noise level by reducing the pressure fluctuations caused by unstable air flow (AF) by widening the distance towards the interior of the cavity (3), between the part of the layer (6) facing the floor (5) and the floor (5) itself. (FIG. 2)

A boundary layer formed by the air flow (AF) on aerodynamic surfaces, the so-called body (2), deteriorates when it reaches the gaps, the so-called cavities (3), in the body (2) and creates a slip layer. The air flow (AF) advancing in the cavity by the movement of the body (2) proceeds along the floor (5) of the cavity (3) and finally contacts the rear wall (4).

By decreasing high pressure levels on the rear wall (4), it is ensured that the aircraft (1) flies in low visibility, the risk of being caught by radar is reduced, the drag force exposed to is decreased, the aerodynamic heating is reduced, the maneuverability of the air vehicle (1) is enhanced, and the survival and service life of the air vehicle is increased. The pressure levels are reduced by changes made on the geometry of the rear wall (4). Changes made on the rear wall 4 are carried out by attaching to the rear wall (4) an apparatus called the reinforcer (7) having a layer (6). The opening of the cavity (3) lids for the use of ammunition or landing gear-like payloads contained in open or closed cavities (3) causes gaps to occur in the body (2) and destabilizes the airflow (AF). Therefore, there is a layer (6) positioned in the cavity (3) in the opposite direction to the air flow (AF), said layer having a bent form, produced in one-piece with the rear wall (4) of the cavity (3), or being detachably attached to the rear wall (4) of the cavity (3), and located on the rear wall (4) so as to cover the rear wall (4). The distance between the part of the layer (6) towards the floor (5) and the floor (5) itself is such that it increases in the direction from the rear wall (4) towards the interior of the cavity (3). The distance between the part of the layer (6) towards the body (2) and the floor (5), on the other hand, decreases towards the rear wall (4). Thanks to the reinforcer (7) having a layer (6) which is oriented towards the interior of the cavity (3), it is enabled to reduce the pressure fluctuations and to decrease the acoustic noises.

Figure 4:
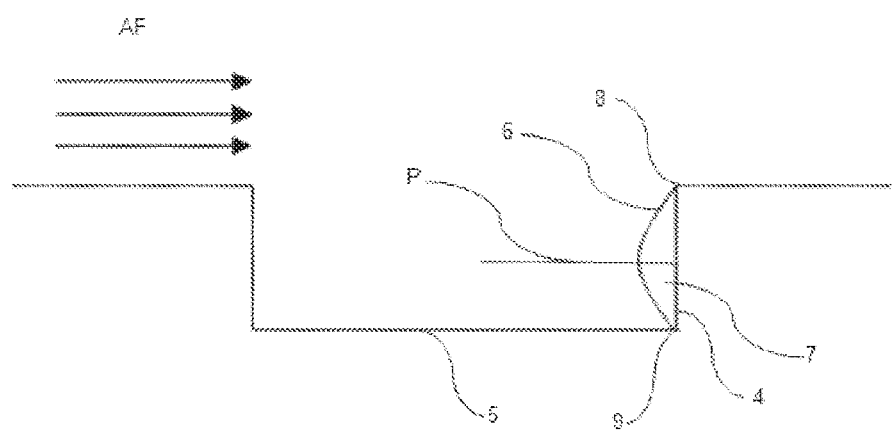
FIG. 4 is a schematic view of the cavity and the reinforcer.

In an embodiment of the invention, the air vehicle (1) comprises an arc-shaped reinforcer (7), located so as to be mirror-symmetrical with respect to a plane (P) passing through the center of the rear wall (4) at an equal distance to a trailing edge (8), which is the edge at which the air flow (AF) leaves the cavity (3), and to an intersection edge (9), where the floor (5) and the rear wall (4) intersect each other. A slip layer occurs because the air flow (AF) forming a boundary layer on the body (2) deteriorates its stability with the cavity (3) located on the body (2). The slip layer formed by the air flow (AF) advancing along the floor (5) of the cavity (3) causes undesirable acoustic noises, vibrations and pressures to occur by hitting the rear wall (4), which is the last surface it contacts within the cavity (3). Turbulence-like air flow (AF) caused by hitting the rear wall (4) causes pressure fluctuations to occur, thereby constituting the main source of aeroacoustic noises. It comprises a reinforcer (7) having a mirror-symmetrical shape with respect to the plane (P) extending perpendicular to the rear wall (4) through an edge which is equidistant to the intersection edge (9) that is the central edge of the rear wall (4) and to the trailing edge (8). It is enabled to reduce the pressure fluctuations by means of the arc-shaped reinforcer (7). (FIG. 4)

In an embodiment of the invention, the air vehicle (1) comprises a reinforcer (7) extending so that one end thereof is positioned at the intersection edge (9) and the other end thereof at the trailing edge (8). Since the length of the arc-shaped layer (6) will increase when the angle (A) value for the arc whose two points are fixed increases, the bulginess of the reinforcer (7) produced increases too. The reinforcer (7), which is arc-shaped and extends between the intersection edge (9) and the trailing edge (8), enables to reduce pressure fluctuations caused by the air flow (AF), thus minimizing the aeroacoustic noise level.

Figure 3:
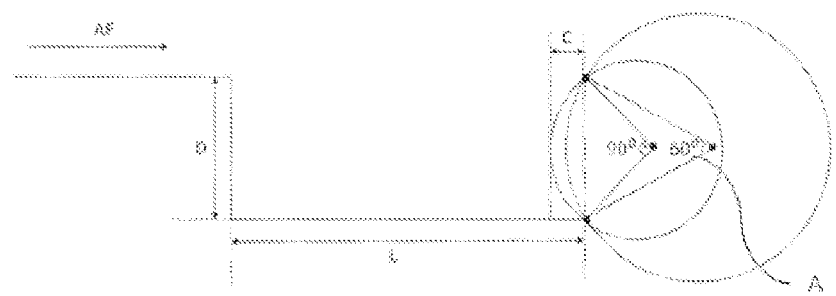
FIG. 3 is a schematic view of the cavity and the reinforcer.

In an embodiment of the invention, the air vehicle (1) comprises a reinforcer (7) produced by an angle (A) that is determined according to the coefficient (DIC) obtained by proportioning the depth (0) of the cavity (3) to the length (C) between the layer (6) and the rear wall (4). In order to determine a suitable parameter for changing the geometry of the rear wall (4) of the cavity (3) located on the air vehicle (1) according to its requirement and capacity; the value of the depth of the cavity (3) is divided by a value corresponding to the longest distance (C) between the arc-shaped reinforcer (7) located on the rear wall (4) and the rear wall (4) itself. With the parameter (DIG) obtained, the angle (A) of the arc shape to be provided to the reinforcer (7) is determined. Therefore, the arc-shaped reinforcer (7), which causes the length (L) of the cavity (3) to shorten, makes it impossible to fit a payload into the cavity (3). (FIG. 3)

In an embodiment of the invention, the air vehicle (1) comprises a reinforcer (7) produced by a piezoelectric material that enables electricity to be generated by the pressure acting on the layer (6). The reinforcer (7), which is made of piezoelectric material, generates electricity thanks to the mechanical effects acting on it due to the air flow (AF) it is exposed to.

In an embodiment of the invention, the air vehicle (1) comprises a reinforcer (7) produced by a material that enables the absorption of aeroacoustic noises. Thanks to the material having a porous structure, damage to the constructive elements of the air vehicle (1) is prevented and the pressure formed on the reinforcer (7) is absorbed.

In an embodiment of the invention, the air vehicle (1) comprises a reinforcer (7) produced by a flexible material that enables the length (C) between the layer (6) and the rear wall (4) to be changed. Thanks to the reinforcer (7) and the layer (6) produced by a flexible material, it is enabled to change the distance between the layer (6) and the rear wall (4). In this way, the length (L) of the cavity (3) is slightly shortened because the arc angle will be small when there is ammunition in the cavity (3) or when the landing gear is in a closed state, and the length (L) of the cavity (3) is shortened more because the arc angle will be relatively large when ammunition is dropped or when the landing gear is deployed.

In an embodiment of the invention, the air vehicle (1) comprises a reinforcer (7) fabricated in one-piece with the rear wall (4). A form that is resistant to high pressure levels is formed by a reinforcer (7) produced in one-piece with the rear wall (4).

In an embodiment of the invention, the air vehicle (1) comprises a reinforcer (7) detachably attached to the rear wall (4). When the reinforcer (7) is not produced in one-piece with the rear wall (4), there is a reinforcer (7) produced which is attached detachably to the rear wall (4) in order to minimize the effects such as vibration, aeroacoustic noise etc. caused by high pressure levels within the cavity (3). (FIG. 6, FIG. 7, FIG. 8, FIG. 9)

Figure 6:
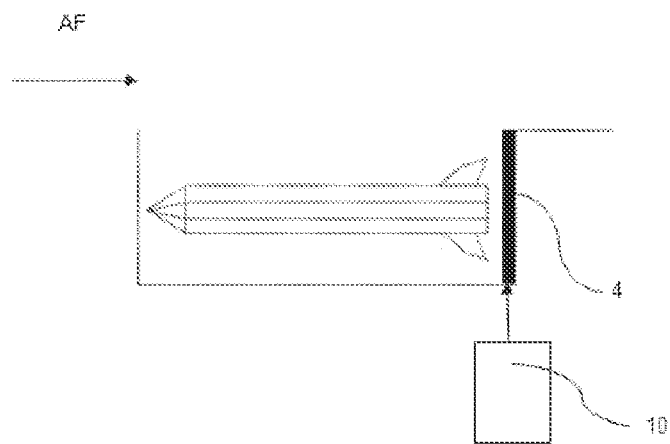
FIG. 6 is a schematic view of the layer, reinforcer, and control unit in the first position (I).
Figure 7:
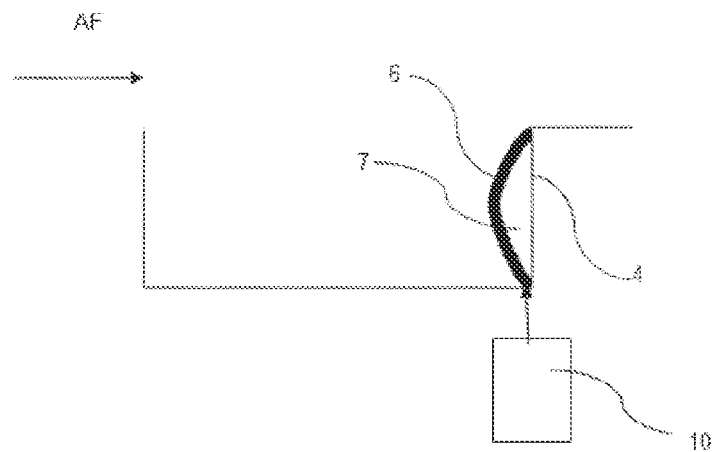
FIG. 7 is a schematic view of the layer, reinforcer, and control unit in the second position (II).

In an embodiment of the invention, the air vehicle (1) comprises a first position (I) wherein the reinforcer (7) has the same form as the rear wall (4) when there is payload in the cavity (3), a second position (II) to which the reinforcer (7) in the form of an arc on the rear wall (4) is brought from the first position (I) when ammunition is dropped or the landing gear is deployed, and a control unit (10) triggering the form change of the reinforcer (7) produced from a shape memory alloy between the first position (I) and the second position (II). Shape-memory alloys display transition between austenite and martensite phases under the influence of temperature and pressure. When there are payloads such as ammunition, landing gear etc. in the cavity (3), the reinforcer (7) produced from a shape memory alloy assumes the first position (I) on the rear wall (4), in the form of the rear wall (4). Since there will be sufficient space in the cavity (3) when the landing gear is deployed or ammunition is dropped, the reinforcer (7) enabling to reduce the pressure level is heated and brought to the second position (II) where it is in the form of an arc. The form change of the reinforcer (7) between the first position (I) and the second position (II) is controlled by the control unit (10). (FIG. 6, FIG. 7)

Figure 8:
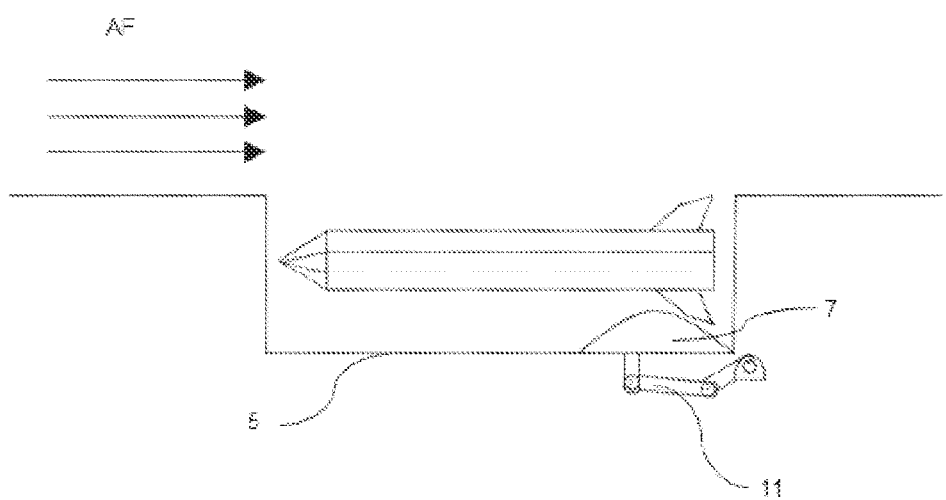
FIG. 8 is a schematic view of the reinforcer, cavity and robotic arm in the third position (HI) when payload is present.
Figure 9:
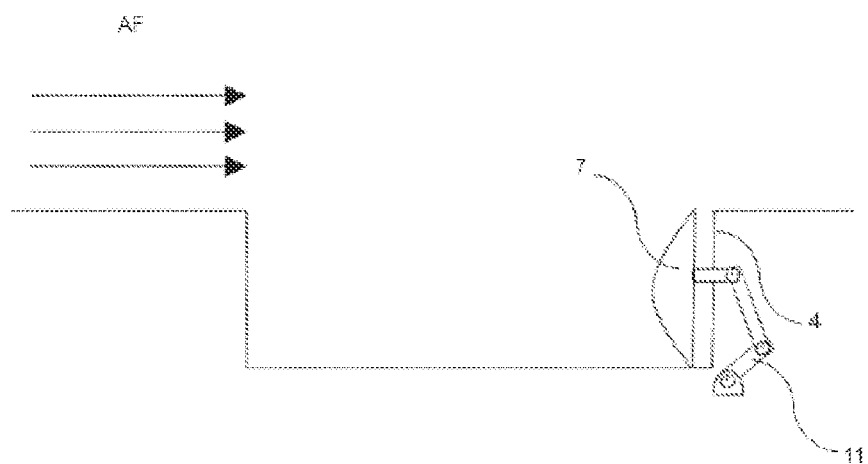
FIG. 9 is a schematic view of the reinforcer, cavity and robotic arm in the fourth position (IV).

In an embodiment of the invention, the air vehicle (1) comprises a third position (III) of the reinforcer (7) wherein the reinforcer is located on the floor (5) when there is payload in the cavity (3), a fourth position (IV) of the reinforcer (7) wherein the reinforcer is brought onto the rear wall (4) from the third position (III) when ammunition is dropped or landing gear is deployed, and a robotic arm (11) that enables the reinforcer (7) to be moved from the third position (III) to the fourth position (IV). When there are payloads such as ammunition, landing gear etc. in the cavity (3) and if the length (L) of the cavity (3) is not sufficient, the position of the reinforcer (7) is changed between the rear wall (4) and the floor (5) by means of the robotic arm (11), The position of the reinforcer (7) on the floor (5) is called the third position (III) and the position of the reinforcer (7) on the rear wall (4) is called the fourth position (IV). (FIG. 8, FIG. 9)

Figure 5:
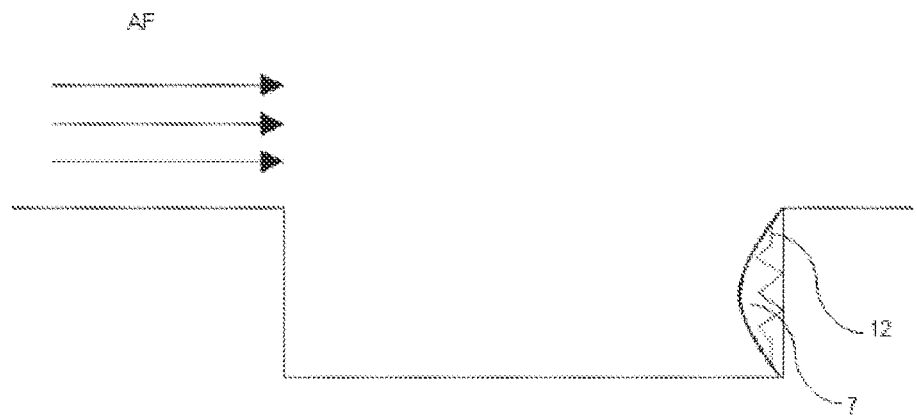
FIG. 5 is a schematic view of the cavity, the reinforcer and the heater.

In an embodiment of the invention, the air vehicle (1) comprises at least one heater (12) located in the reinforcer (7) and preventing icing of the reinforcer (7) arising from the air flow (AF) on the body (2) and/or due to atmospheric conditions. Problems such as icing occur on the aircraft (1) due to atmospheric conditions and air flow (AF). A heater (12) is provided in the reinforcer (7) to eliminate or prevent the icing problem. Thanks to the heat energy emitted by the heater (12), it is ensured that the icing that may occur or have occurred on and around the reinforcer (7) can be prevented and/or eliminated in an effective and reliable manner. (FIG. 5)

The invention claimed is:

1. An air vehicle (1) comprising:
 a body (2),
 a cavity (3) located on the body (2),
 a rear wall (4) forming a surface on which an airflow (AF) occurring with movement of the body (2) leaves the cavity (3),
 a floor (5) over which the airflow (AF) moves along the cavity (3), and
 at least one reinforcer (7) having a layer (6) with a curved form in a vertical direction, located on the rear wall (4) and positioned so as to extend into the cavity (3) with an outermost portion of the curved form centered vertically along a height of the rear wall (4), said layer (6) reducing a noise level by decreasing pressure fluctuations caused by unstable air flow (AF);
 wherein each reinforcer (7) has an arc shape and is located so as to be mirror-symmetrical with respect to a plane (P) passing through a center of the rear wall (4) at an equal distance to a trailing edge (8), at which the air flow (AF) leaves the cavity (3) and to an intersection edge (9) where the floor (5) and the rear wall (4) intersect.

2. The air vehicle (1) as claimed in claim 1, wherein each reinforcer (7) extends so that one end thereof is positioned at the intersection edge (9) and the other end thereof is positioned at the trailing edge (8).

3. The air vehicle (1) as claimed in claim 1, wherein each reinforcer (7) is produced by a piezoelectric material that enables electricity to be generated by pressure acting on the layer (6).

4. The air vehicle (1) as claimed in claim 1, wherein each reinforcer (7) is produced by a material that enables absorption of aeroacoustic noises.

5. The air vehicle (1) as claimed in claim 1, wherein each reinforcer (7) is produced by a flexible material that enables a length (C) between the layer (6) and the rear wall (4) to be changed.

6. The air vehicle (1) as claimed in claim 1, wherein each reinforcer (7) is produced in one-piece with the rear wall (4).

7. The air vehicle (1) as claimed in claim 1, wherein each reinforcer (7) is detachably attached to the rear wall (4).

8. The air vehicle (1) as claimed in claim 7, wherein each reinforcer (7) has a first position (I) wherein each reinforcer has a same flat form as the rear wall (4) when there is a payload in the cavity (3), a second position (II) in which each reinforcer (7) takes the form of an arc on the rear wall (4) when the payload is removed from the cavity, and comprising a control unit (10) triggering a form change to occur in each reinforcer (7) produced from a shape memory alloy between the first position (I) and the second position (II).

9. The air vehicle (1) of claim 8, wherein the payload is ammunition.

10. The air vehicle (1) of claim 8, wherein the payload is a landing gear.

11. The air vehicle (1) as claimed in claim 7, wherein each reinforcer (7) has a third position (III) wherein each reinforcer is located on the floor (5) when there is a payload in the cavity (3), a fourth position (IV) of each reinforcer (7) wherein each reinforcer is on the rear wall (4) when the payload is removed from the cavity, and comprising a robotic arm (11) configured to move each reinforcer (7) from the third position (III) to the fourth position (IV).

12. The air vehicle (1) of claim 11, wherein the payload is ammunition.

13. The air vehicle (1) of claim 11, wherein the payload is a landing gear.

14. The air vehicle (1) as claimed in claim 1, comprising at least one heater (12) located in each reinforcer (7) for preventing icing of each reinforcer (7) arising from the air flow (AF) on the body (2) and/or due to atmospheric conditions.

* * * * *